(12) United States Patent
Lai (10) Patent No.: US 12,225,300 B2
(45) Date of Patent: Feb. 11, 2025

(54) WHITE BALANCE COMPENSATION METHOD AND APPARATUS AND ELECTRONIC DEVICE

(71) Applicant: VIVO MOBILE COMMUNICATION CO., LTD., Guangdong (CN)

(72) Inventor: Youpan Lai, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 121 days.

(21) Appl. No.: 18/111,639

(22) Filed: Feb. 20, 2023

(65) Prior Publication Data
US 2023/0199331 A1 Jun. 22, 2023

Related U.S. Application Data

(63) Continuation of application No. PCT/CN2021/114147, filed on Aug. 23, 2021.

(30) Foreign Application Priority Data

Aug. 26, 2020 (CN) .......................... 202010870987.8

(51) Int. Cl.
*H04N 23/71* (2023.01)
*H04N 23/13* (2023.01)
*H04N 23/88* (2023.01)

(52) U.S. Cl.
CPC ............. *H04N 23/88* (2023.01); *H04N 23/13* (2023.01); *H04N 23/71* (2023.01)

(58) Field of Classification Search
CPC ......... H04N 23/88; H04N 23/71; H04N 23/13

USPC ....................................................... 348/223.1
See application file for complete search history.

(56) References Cited

U.S. PATENT DOCUMENTS

| 5,283,632 | A | 2/1994 | Suzuki et al. |
| 2004/0233295 | A1* | 11/2004 | Hoshuyama ......... H04N 23/843 348/222.1 |
| 2007/0064119 | A1 | 3/2007 | Komiya et al. |
| 2009/0256927 | A1 | 10/2009 | Komiya et al. |
| 2009/0295947 | A1 | 12/2009 | Komiya et al. |

(Continued)

FOREIGN PATENT DOCUMENTS

| CN | 102037734 A | 4/2011 |
| CN | 103248902 A | 8/2013 |

(Continued)

*Primary Examiner* — Joel W Fosselman
(74) *Attorney, Agent, or Firm* — Price Heneveld LLP (57) ABSTRACT

A white balance compensation method and apparatus, and an electronic device are disclosed. The method includes: obtaining color information of each of M first regions included in a first image acquired by a spectral sensor; performing white balance compensation using a target numerical value for a second image acquired by a color sensor, and obtaining color information of each of M second regions included in the white-balance compensated second image, one second region corresponding to one first region; and for an i-th second region, in a case that first and second color information meet a preset condition, performing white balance compensation for the i-th second region according to the first and second color information, the first color information is color information of the i-th second region, and the second color information is color information of a first region corresponding to the i-th second region.

15 Claims, 5 Drawing Sheets

(56) References Cited

U.S. PATENT DOCUMENTS

| | | |
|---|---|---|
| 2010/0157160 A1 | 6/2010 | Tang |
| 2011/0058072 A1 | 3/2011 | Wang et al. |
| 2011/0205389 A1 | 8/2011 | Zhang |
| 2013/0215288 A1 | 8/2013 | Takeuchi |
| 2014/0092276 A1 | 4/2014 | Huang |
| 2015/0350620 A1 | 12/2015 | Kuchinki |
| 2016/0227100 A1 | 8/2016 | Liu et al. |
| 2016/0269707 A1 | 9/2016 | Yoshizaki |
| 2017/0026626 A1 | 1/2017 | Wang |

FOREIGN PATENT DOCUMENTS

| | | |
|---|---|---|
| CN | 104661003 A | 5/2015 |
| CN | 107920236 A | 4/2018 |
| CN | 108063891 A | 5/2018 |
| CN | 108718405 A | 10/2018 |
| CN | 208353496 U | 1/2019 |
| CN | 110740307 A | 1/2020 |
| CN | 111551266 A | 8/2020 |
| CN | 111586300 A | 8/2020 |
| CN | 111953955 A | 11/2020 |
| EP | 3429200 B1 | 9/2019 |
| JP | 5116389 B2 | 1/2013 |
| KR | 20150138082 A | 12/2015 |
| WO | 2014057354 A8 | 4/2015 |

\* cited by examiner

WHITE BALANCE COMPENSATION METHOD AND APPARATUS AND ELECTRONIC DEVICE

This application is continuation application of PCT International Application No. PCT/CN2021/114147 filed on Aug. 23, 2021, which claims priority to Chinese Patent Application No. 202010870987.8, filed with the China National Intellectual Property Administration on Aug. 26, 2020 and entitled "WHITE BALANCE COMPENSATION METHOD AND APPARATUS AND ELECTRONIC DEVICE", both of which are incorporated herein by reference in their entireties.

TECHNICAL FIELD

This application pertains to the field of communications technologies, and specifically relates to a white balance compensation method and apparatus, and an electronic device.

BACKGROUND

In different lights, images acquired by a sensor can show different colors. For example, an image taken in a fluorescent room may appear greenish, and an image taken in tungsten filament light may appear yellowish. In this regard, white balance (WB) technology can be used to perform AWB gain compensation for the RGB (red, green, and blue) components of all pixels in an entire picture, to eliminate the influence of a light source on the image acquired by the sensor.

Currently, when a plurality of light sources are mixed, there are generally two AWB compensation schemes: in one scheme, a color temperature value close to an intermediate value is obtained after weighting based on proportions of the plurality of light sources, and an AWB compensation gain corresponding to the color temperature value is calculated. However, because the color temperature value is between color temperature values of the plurality of light sources, a region corresponding to a light source with a high color temperature appears bluish, and a region corresponding to a light source with a low color temperature appears yellowish; and in the other scheme, a dominant light source is determined from the plurality of light sources according to an empirical value, and a corresponding AWB compensation gain is applied to the dominant light source. However, this scheme can only resolve the color cast problem of the dominant light source, but a more serious color cast phenomenon appears in regions of other light sources. Therefore, when a plurality of light sources are mixed, the color reduction effect of AWB compensation in the prior art is poor.

SUMMARY

According to a first aspect, an embodiment of this application provides a white balance compensation method. The method includes: obtaining color information of each of M first regions included in a first image, the first image being an image acquired by a spectral sensor; performing white balance compensation using a target numerical value for a second image acquired by a color sensor, and obtaining color information of each of M second regions included in the white-balance compensated second image, one second region corresponding to one first region; and for an i-th second region, in a case that first color information and second color information meet a preset condition, performing white balance compensation for the i-th second region according to the first color information and the second color information, where the first color information is color information of the i-th second region, and the second color information is color information of a first region corresponding to the i-th second region; where M is an integer greater than 1, and i is a positive integer less than or equal to M.

According to a second aspect, an embodiment of this application provides a white balance compensation apparatus. The white balance compensation apparatus includes an obtaining module and a processing module. The obtaining module is configured to obtain color information of each of M first regions included in a first image, the first image being an image acquired by a spectral sensor; the processing module is configured to perform white balance compensation using a target numerical value for a second image acquired by a color sensor; the obtaining module is further configured to obtain color information of each of M second regions included in the white-balance compensated second image, one second region corresponding to one first region; and the processing module is further configured to: for an i-th second region, in a case that first color information and second color information meet a preset condition, perform white balance compensation for the i-th second region according to the first color information and the second color information, where the first color information is color information of the i-th second region, and the second color information is color information of a first region corresponding to the i-th second region; where M is an integer greater than 1, and i is a positive integer less than or equal to M.

According to a third aspect, an embodiment of this application provides an electronic device. The electronic device includes a processor, a memory, and a program or instructions stored in the memory and capable of running on the processor, where when the program or instructions are executed by the processor, the steps of the method according to the first aspect are implemented.

According to a fourth aspect, an embodiment of this application provides a readable storage medium, where the readable storage medium stores a program or instructions, and when the program or instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that terms used in this way are used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

The following describes some terms and nouns included in the embodiments of the present application.

Color temperature (CT) is a unit of measurement that indicates the color components contained in light. Theoretically speaking, after an absolute black body is heated from absolute zero (−273° C.), the color of the absolute black body corresponds to a color temperature. After being heated, the black body gradually turns from black to red, turns yellow, turns white, and finally emits blue light. The spectral component of the light emitted by the black body that has been heated to a given temperature is called the color temperature at this temperature, and the unit of measurement is "K" (Kelvin).

Spectrum, short for optical spectrum, is a pattern in which the dispersed monochromatic lights are arranged in sequence according to the wavelength or frequency after the polychromatic light is split by a dispersion system (such as a prism and a grating). Part of the visible spectrum of the spectrum is the portion of the electromagnetic spectrum that is visible to the human eye, and electromagnetic radiation in this wavelength range is called visible light. The wavelength range of visible light is from 380 nm to 780 nm (nanometers).

At present, the display generally uses an RGB color space to express colors of an image. The RGB color space is the most commonly used way to express color information, in which intensity values (such as brightness values) of three primary colors red (R), green (G), and blue (B) are used to quantitatively represent colors, with three colors of RGB superimposed on each other to achieve color mixing. Different proportions of three colors result in different colors. Various mixing effects can be obtained by changing proportions of the three colors mixed. The RGB color space can be regarded as a unit cube in a three-dimensional Cartesian coordinate system. Any color can be represented by a point in the three-dimensional space of the RGB color space. In the RGB color space, any color light F can be formed by the addition of different components of RGB three colors: F=r[R]+g[G]+b[B]. On the basis of the RGB color space, an XYZ color space can be obtained by using mathematical methods to select three ideal primary colors to replace the actual three primary colors, so as to change spectral tristimulus values and chromaticity coordinates r, g, and b in the RGB system to positive values.

Two types of image sensors are involved in embodiments of this application: spectral sensor and color sensor. The spectral sensor includes an optical part and a display part. In a radiation path behind an incident aperture on the housing of the sensor, the optical part splits the incident light, causing split beams to enter several filters. These filters have different spectral transmission ranges so that certain bands can be imaged. The color sensor is a conventional RGB array image sensor, which may be referred to as an RGB sensor for short. The RGB sensor, for example, may be a bayer sensor capable of measuring a color value of an R color channel, a color value of a G color channel, and a color value of a B color channel using a color sensitive element and realizing imaging after superimposing these three color components. For detailed description of these two types of image sensors, reference may be made to the prior art, and details are not described herein. It can be understood that these two types of image sensors have different imaging principles, and therefore have different characteristics: the spectral sensor has characteristics of good color performance but poor photosensitive performance; and the color sensor has characteristics of good photosensitive performance but poor color performance.

For scenarios in which a plurality of light sources are mixed, an embodiment of this application provides a white balance compensation method by utilizing respective characteristics of these two types of image sensors. Because all first regions of a first image acquired by a spectral sensor are in one-to-one correspondence with all second regions of a white-balance compensated second image acquired by a color sensor, when color information of a first region and color information of a second region meet a preset condition, the color information of the second region can be AWB compensated using the color information of the first region, to improve the color reduction effect of the shot picture.

The following describes in detail a white balance compensation method, a white balance compensation apparatus, and an electronic device provided in the embodiments of this application by using specific embodiments and application scenarios thereof with reference to the accompanying drawings.

Figure 1:
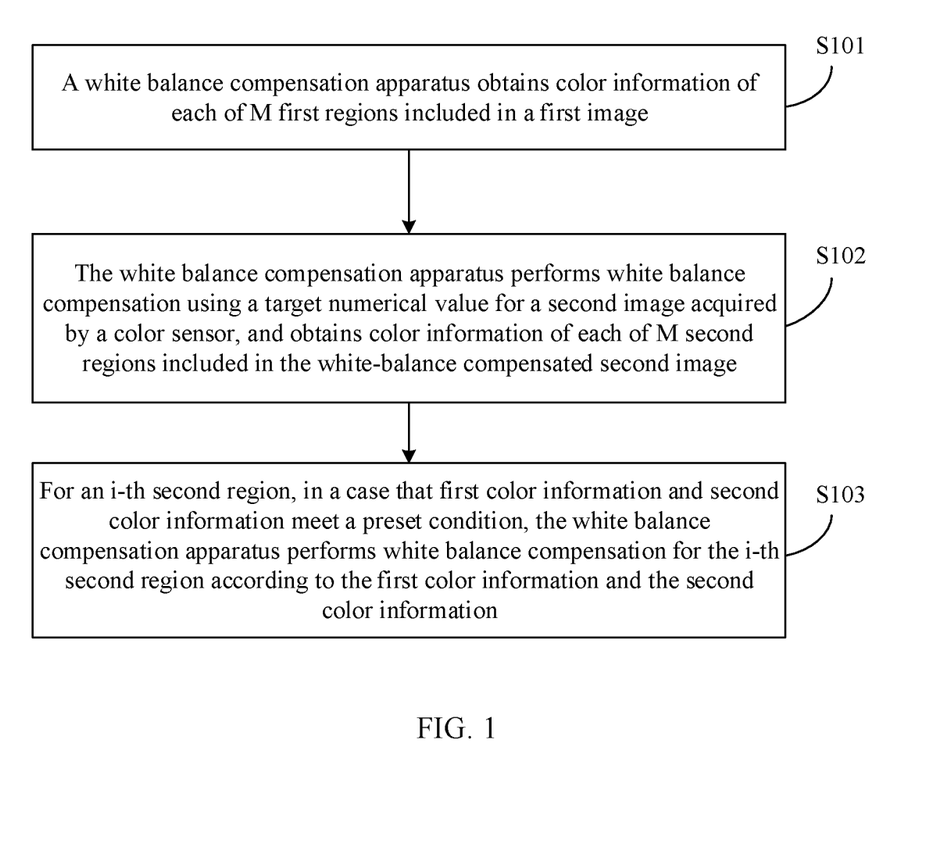
FIG. 1 is a schematic diagram of a white balance compensation method according to an embodiment of this application.

As shown in FIG. 1, an embodiment of this application provides a white balance compensation method. The white balance compensation method may include S101 to S103 in the following. The following illustrates the white balance compensation method by taking a white balance compensation apparatus as an example of the execution body.

S101. A white balance compensation apparatus obtains color information of each of M first regions included in a first image.

The first image is an image acquired by a spectral sensor. The color information of each of the M first regions may be used to indicate a color of each first region. M is an integer greater than 1.

In this embodiment of this application, the white balance compensation apparatus may first acquire the first image using the spectral sensor, then divide the first image into M first regions, and then obtain the color information of each of the M first regions.

Figure 2:
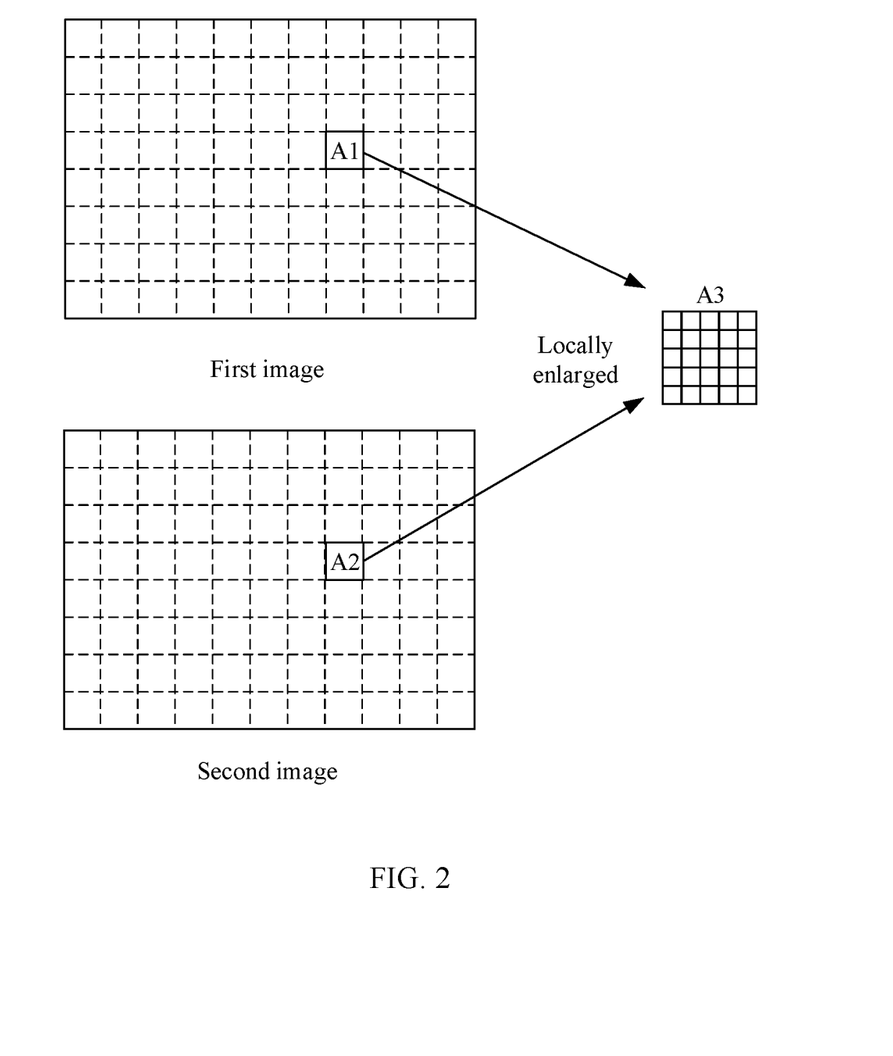
FIG. 2 is a schematic diagram of region division of an image according to an embodiment of this application.

Optionally, each of the M first regions may consist of N pixels, N being an integer greater than 1. Specifically, a P*P group consisting of P pixels per row and P pixels per column forms one first region. For example, as shown in FIG. 2, the first image is divided into 11*8 first regions, each first region including 25 pixels.

Optionally, for each of the M first regions, the color information of a first region may be represented by one color value, and the color value may include at least one of the following: an intensity value of the R color channel of the first region, an intensity value of the G color channel of a first region, an intensity value of the B color channel of the first region, and a color temperature value of the first region. These intensity values may be obtained with reference to the following equations, and details are not described herein.

Optionally, the obtaining color information of each of the M first regions may include obtaining the color information of each first region according to a spectral curve of each first region. The spectral curve of each first region may be determined according to the photosensitive value of each first region.

The following illustrates, by using an example in which each first region consists of N pixels, a specific implementation of obtaining the color information of each first region according to a spectral curve of each first region.

(1) Divide the visible light wavelength range into N band ranges, one of the N pixels corresponding to one of the N band ranges.

Figure 3:
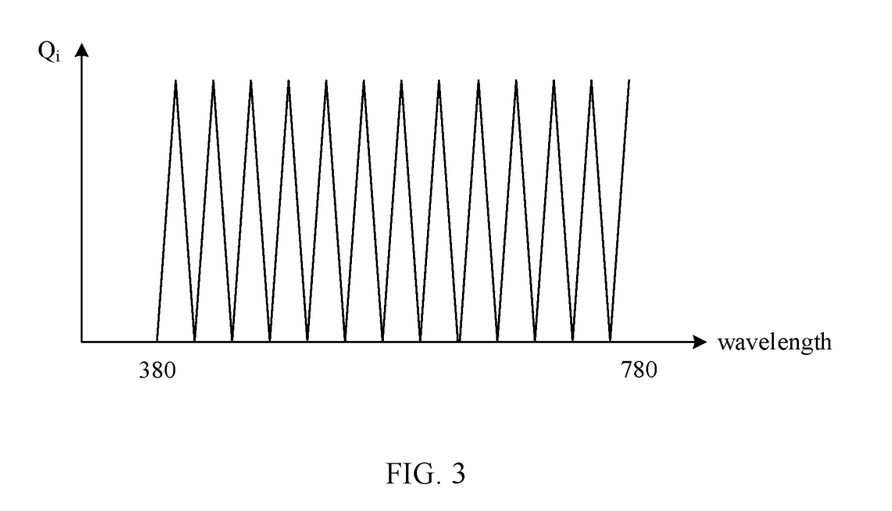
FIG. 3 is a schematic diagram of region division of a band according to an embodiment of this application.

Optionally, the wavelength range of visible light is from 380 nm to 780 nm. One first region corresponds to N=P*P band ranges, and a length of each band range is (780−380)/(P*P) nm. For example, as shown in FIG. 3, for P=5, one first region corresponds to 25 band ranges, and in the first region, a band range of pixel 1 is from 380 nm to 396 nm, a band range of pixel 2 is from 396 nm to 412 nm, a band range of pixel 3 is from 412 nm to 428 nm, a band range of pixel 4 is from 428 nm to 444 nm, a band range of pixel 5 is from 444 nm to 460 nm, a band range of pixel 6 is from 460 nm to 476 nm, . . . , and a band range of pixel 25 is from 764 nm to 780 nm.

(2) Obtain a photosensitive value of each pixel in a band range corresponding to each pixel.

In a radiation path behind an incident aperture on the housing of the spectral sensor, an incident light beam is split and directed into different first regions. Each pixel in each first region has a different spectral transmission range (that is, band range), so that a photosensitive value (also referred to as a photosensitive intensity, which may be used to characterize the intensity of light) of each pixel in each first region may be obtained.

(3) Obtain a spectral curve of each first region according to the photosensitive values of the N pixels.

Optionally, it is assumed that a response value of pixel i is Qi. After response values Q1, Q2, Q3, . . . , QN of the N pixels in a first region are obtained, these response values may be normalized, then curves corresponding to the response values are connected into a smooth curve, and the smooth curve can be used as a spectral curve of the first region.

(4) Obtain color information of each first region according to a spectral curve of each first region.

Optionally, for each of the M first regions, the color information of a first region may be represented by one color value, and the color value may include at least one of the following: an intensity value of the R color channel of the first region, an intensity value of the G color channel of the first region, an intensity value of the B color channel of the first region, and a color temperature value of the first region.

The intensity value of the R color channel of the first region may be obtained through the following equation 1:

$$R = \sum_{\lambda=380\,nm}^{780\,nm} I(\lambda)R(\lambda)_\Delta \lambda$$

The intensity value of the G color channel of the first region may be obtained through the following equation 2:

$$G = \sum_{\lambda=380\,nm}^{780\,nm} I(\lambda)G(\lambda)_\Delta \lambda$$

The intensity value of the B color channel of the first region may be obtained through the following equation 3:

$$B = \sum_{\lambda=380\,nm}^{780\,nm} I(\lambda)B(\lambda)_\Delta \lambda$$

$I(\lambda)$ is the spectral curve corresponding to the pixels in the first region, and may be used to characterize photosensitive values of the pixels; $R(\lambda)$ is a first preset equation, $G(\lambda)$ is a second preset equation, $B(\lambda)$ is a third preset equation, and these three preset equations may be used to respectively characterize the intensity of the R color channel, the intensity of the G color channel, and the intensity of the B color channel; and $_\Delta\lambda$ is a resolution, and the resolution may be a preset value, for example, 0.001 mm (millimeter).

With reference to the foregoing (1) to (4), in a case that the color information of each first region includes at least a color temperature value of each first region, the obtaining color information of each first region according to a spectral curve of each first region specifically may be implemented as follows:

A1: Integrate the spectral curve of each first region with the first preset equation, the second preset equation, and the third preset equation to obtain an intensity value of the R color channel of each first region, an intensity value of the G color channel of each first region, and an intensity value of the B color channel of each first region, respectively;

A2: Convert the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and A3: Obtain a color temperature value of each first region based on the intensity value of the X color space, the intensity value of the Y color space, and the intensity value of the Z color space.

For a specific implementation of converting the RGB color space to the YUV color space, reference may be made to the standard color equation in the related art; and for a specific implementation of obtaining the color temperature value according to the YUV color space, reference may be made to an equation in the related art to obtain the color temperature. This is not specifically limited in this embodiment of this application.

S102. The white balance compensation apparatus performs white balance compensation using a target numerical value for a second image acquired by a color sensor, and obtains color information of each of M second regions included in the white-balance compensated second image.

The color information of each of the M second regions may be used to indicate a color of each second region, and one of the M second regions corresponds to one of the M first regions.

In this embodiment of this application, the white balance compensation apparatus may first acquire the second image using the color sensor, then perform white balance compensation using a target numerical value for the second image, then divide the white-balance compensated second image into M second regions, and then obtain the color information of each of the M second regions.

The target value is an estimated value calculated by using a white balance algorithm in the related art. For example, an automatic white balance algorithm is obtaining a color temperature value close to an intermediate value after weighting based on proportions of a plurality of light sources, calculating an AWB compensation gain corresponding to the color temperature value, and using the AWB compensation gain as the target numerical value. Another scheme is to determine a dominant light source from the plurality of light sources, calculate a corresponding AWB compensation gain for the dominant light source, and apply the AWB compensation gain as the target numerical value. With reference to the background in this application, the white balance algorithm in the prior art can only be used to perform preliminary AWB gain compensation for the RGB components of all pixels in the entire picture, so when a plurality of light sources are mixed, the color reduction effect of such AWB compensation is poor.

It should be noted that in this embodiment of this application, the first image and the second image are images with a same shot content obtained by shooting a same object respectively using the spectral sensor and the color sensor. However, due to different characteristics of the spectral sensor and the color sensor, the two images have different shooting effects. In order to compare the first image and the second image, the first image without white balance compensation is divided into M second regions in this embodiment of this application. In addition, the second image acquired by the color sensor is first subjected to white balance compensation by using the target value, and then the white-balance compensated second image is divided into M second regions by using the same region division method as that for the first image. In this way, whether to perform more accurate white balance compensation respectively for each second region corresponding to each first region may be determined according to the difference between each first region and each second region corresponding to each first region.

For example, still taking FIG. 2 as an example, the first image and the white-balance compensated second image are each divided into 11*8 regions, and each region includes 25 pixels. For example, if one first region in the fourth row and the eighth column of the first image is denoted by A1, and one second region in the fourth row and the eighth column of the white-balance compensated second image is denoted by A2, the first region A1 corresponds to the second region A2, and the first region A1 and the second region A2 include the same shot content, but the first region A1 has better color performance and the second region A2 has better photosensitive performance.

Optionally, for each of the M second regions, color information of one second region may be represented by one color value, and the color value may include at least one of the following: an intensity value of the R color channel of the second region, an intensity value of the G color channel of the second region, an intensity value of the B color channel of the second region, and a color temperature value of the second region.

Specifically, in this embodiment of this application, the first color value and the second color value correspond to a same characteristic value. To be specific, the first color value and the second value meet at least one of (A) to (D):

(A) The first color value includes an intensity value of the R color channel of the i-th second region, and the second color value includes an intensity value of the R color channel of a first region corresponding to the i-th second region;

(B) The first color value includes an intensity value of the G color channel of the i-th second region, and the second color value includes an intensity value of the G color channel of a first region corresponding to the i-th second region;

(C) The first color value includes an intensity value of the B color channel of the i-th second region, and the second color value includes an intensity value of the B color channel of a first region corresponding to the i-th second region; and (D) The first color value includes a color temperature value of the i-th second region, and the second color value includes a color temperature value of a first region corresponding to the i-th second region.

Optionally, because the color sensor is a conventional RGB array image sensor, after the white balance compensation is performed for the second image, the intensity value of the R color channel of each second region, the intensity value of the G color channel of each second region, and the intensity value of the B color channel of each second region may be obtained according to the existing equations.

Further, after the intensity value of the R color channel of each second region, the intensity value of the G color channel of each second region, and the intensity value of the B color channel of each second region are obtained, A1 to A3 in the foregoing S101 can be used to obtain the color temperature value of each second region.

S103. For an i-th second region, in a case that first color information and second color information meet a preset condition, the white balance compensation apparatus performs white balance compensation for the i-th second region according to the first color information and the second color information.

The first color information may be color information of the i-th second region and the second color information may be color information of a first region corresponding to the i-th second region, and i is a positive integer less than or equal to M.

Optionally, the first color information is a first color value, the second color information is a second color value, and the preset condition is that an absolute value of a difference between the first color value and the second value is greater than or equal to a preset color value.

Further, the first color value may include at least one of the following: an intensity value of the R color channel of the i-th second region, an intensity value of the G color channel of the i-th second region, an intensity value of the B color channel of the i-th second region, and a color temperature value of the i-th second region.

Further, the second color value may include at least one of the following: an intensity value of the R color channel of a first region corresponding to the i-th second region, an intensity value of the G color channel of the first region corresponding to the i-th second region, an intensity value of the B color channel of the first region corresponding to the i-th second region, and a color temperature value of the first region corresponding to the i-th second region.

The following illustrates cases in which the color values meet the preset condition.

If the first color value includes an intensity value of the R color channel of an i-th second region, and the second color value includes an intensity value of the R color channel of a first region corresponding to the i-th second region, a case in which the first color information and the second color information meet the preset condition means that an absolute value of a difference between the intensity value of the R color channel of the i-th second region and the intensity value of the R color channel of the first region corresponding to the i-th second region is greater than or equal to a first numerical value.

If the first color value includes an intensity value of the G color channel of an i-th second region, and the second color value includes an intensity value of the G color channel of a first region corresponding to the i-th second region, a case in which the first color information and the second color information meet the preset condition means that an absolute value of a difference between the intensity value of the G color channel of the i-th second region and the intensity value of the G color channel of the first region corresponding to the i-th second region is greater than or equal to a second numerical value.

If the first color value includes an intensity value of the B color channel of an i-th second region, and the second color value includes an intensity value of the B color channel of a first region corresponding to the i-th second region, a case in which the first color information and the second color information meet the preset condition means that an absolute value of a difference between the intensity value of the B color channel of the i-th second region and the intensity value of the B color channel of the first region corresponding to the i-th second region is greater than or equal to a third numerical value.

If the first color value includes a color temperature value of an i-th second region, and the second color value includes a color temperature value of a first region corresponding to the i-th second region, a case in which the first color information and the second color information meet the preset condition means that an absolute value of a difference between the color temperature value of the i-th second region and the color temperature value of the first region corresponding to the i-th second region is greater than or equal to a fourth numerical value.

It should be noted that the first numerical value, the second numerical value, the third numerical value, and the fourth numerical value may be the same or different according to actual use requirements, which is not limited in this embodiment of this application.

Optionally, the performing white balance compensation for the i-th second region according to the first color information and the second color information may be implemented in the following manner:

(a) using a product of the first color value and a first preset ratio as a first compensation value;

(b) using a product of the second color value and a second preset ratio as a second compensation value;

(c) using a sum of the first compensation value and the second compensation value as a target compensation value; and (d) performing white balance compensation for the i-th second region according to the target compensation value.

Optionally, a sum of the first preset ratio and the second preset ratio is 1. For example, if the first preset ratio is represented by ratio and the second preset ratio is represented by (1−ratio), white balance compensation value of i-th second region=ratio*first color value+(1−ratio)*second color value.

It can be understood that, for the M second regions, some of the second regions meet the preset condition, so white balance compensation is required, while some of the second regions do not meet the preset condition, so white balance compensation is not required. The spectral sensor has characteristics of good color performance but poor photosensitive performance, and the color sensor has characteristics of good photosensitive performance but poor color performance. Therefore, for each second region requiring white balance compensation, when the first color value obtained using the spectral sensor and the second color value obtained using the color sensor meet the preset condition, to make the two sensors play to their strengths, the first color value and the second color value are added according to the preset ratio, so as to obtain a more accurate target compensation value, and then the target compensation value is used for white balance compensation of the second region, improving the color reduction effect of the shot picture.

In addition, for a plurality of second regions requiring white balance compensation, because color values of the second regions may be different, and color values of the first regions corresponding to the second regions may be different, the white balance compensation values of the second regions may also be different. In this way, because compensation strategies differ for each second region in the white-balance compensated second image, color information of the regions can be accurately corrected, allowing for a more accurate color reduction of the shot picture.

This application provides a white balance compensation method. Because characteristics of the spectral sensor and the color sensor are different and all first regions of the first image acquired by a spectral sensor are in one-to-one correspondence with all second regions of a white-balance compensated second image acquired by a color sensor, when the color information of a first region and the color information of a second region meet the preset condition, the color information of the second region can be AWB compensated using the color information of the first region, thereby improving the color reduction effect of the shot picture.

It should be noted that the white balance compensation method provided in this embodiment of this application may be performed by a white balance compensation apparatus, or by a control module in the white balance compensation apparatus for performing the white balance compensation method. In this embodiment of this application, the white balance compensation apparatus provided in this embodiment of this application is described by using an example in which the white balance compensation apparatus performs the white balance compensation method.

Figure 4:
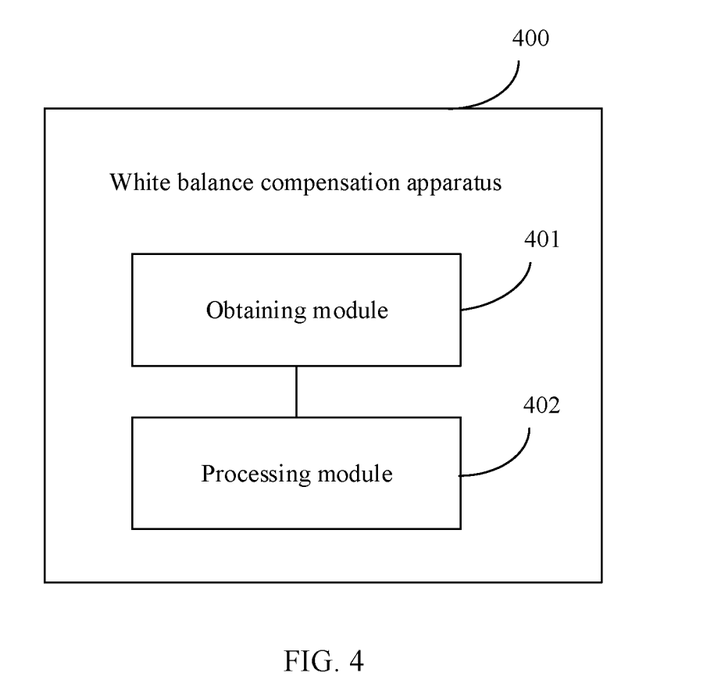
FIG. 4 is a schematic structural diagram of a white balance compensation apparatus according to an embodiment of this application.

As shown in FIG. 4, an embodiment of this application provides a white balance compensation apparatus 400. The white balance compensation apparatus 400 includes an obtaining module 401 and a processing module 402. The obtaining module 401 may be configured to obtain color information of each of M first regions included in a first image, the first image being an image acquired by a spectral sensor. The processing module 402 may be configured to perform white balance compensation using a target numerical value for a second image acquired by a color sensor. The obtaining module 401 may be further configured to obtain color information of each of M second regions included in the white-balance compensated second image, one second region corresponding to one first region. The processing module 402 may be further configured to: for an i-th second region, in a case that first color information and second color information meet a preset condition, perform white balance compensation for the i-th second region according to the first color information and the second color information, where the first color information is color information of the i-th second region, and the second color information is color information of a first region corresponding to the i-th second region. M is an integer greater than 1, and i is a positive integer less than or equal to M.

Optionally, the first color information is a first color value, the second color information is a second color value, and the preset condition is that an absolute value of a difference between the first color value and the second value is greater than or equal to a preset color value.

The first color value and the second value meet at least one of the following:

the first color value includes an intensity value of an R color channel of the i-th second region, and the second color value includes an intensity value of an R color channel of a first region corresponding to the i-th second region;

the first color value includes an intensity value of a G color channel of the i-th second region, and the second color value includes an intensity value of a G color channel of a first region corresponding to the i-th second region;

the first color value includes an intensity value of a B color channel of the i-th second region, and the second color value includes an intensity value of a B color channel of a first region corresponding to the i-th second region; and the first color value includes a color temperature value of the i-th second region, and the second color value includes a color temperature value of a first region corresponding to the i-th second region.

Optionally, the processing module 402 may be specifically configured to:

use a product of the first color value and a first preset ratio as a first compensation value;

use a product of the second color value and a second preset ratio as a second compensation value;

use a sum of the first compensation value and the second compensation value as a target compensation value; and perform white balance compensation for the i-th second region according to the target compensation value.

Optionally, the obtaining module 401 is specifically configured to obtain color information of each first region according to a spectral curve of each first region.

Optionally, the color information of each first region includes at least a color temperature value of each first region. The obtaining module 401 may be specifically configured to:

integrate the spectral curve of each first region with a first preset equation, a second preset equation, and a third preset equation to obtain an intensity value of the R color channel of each first region, an intensity value of the G color channel of each first region, and an intensity value of the B color channel of each first region, respectively;

convert the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and obtain a color temperature value of each first region based on the intensity value of the X color space, the intensity value of the Y color space, and the intensity value of the Z color space.

Optionally, each first region includes N pixels, N being an integer greater than 1. The processing module 402 is further configured to divide the visible light wavelength range into N band ranges before the obtaining module 401 obtains color information of each first region according to a spectral curve of each first region, one of the N pixels corresponding to one of the N band ranges. The obtaining module 401 may be further configured to obtain a photosensitive value of each pixel in a band range corresponding to each pixel and obtain a spectral curve of each first region according to the photosensitive values of the N pixels.

This application provides a white balance compensation apparatus. Because characteristics of the spectral sensor and the color sensor are different and all first regions of the first image acquired by a spectral sensor are in one-to-one correspondence with all second regions of a white-balance compensated second image acquired by a color sensor, when the color information of a first region and the color information of a second region meet the preset condition, the white balance compensation apparatus can perform AWB compensation for the color information of the second region by using the color information of the first region, thereby improving the color reduction effect of the shot picture.

The white balance compensation apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, a self-service machine, or the like. This is not specifically limited in the embodiments of this application.

The white balance compensation apparatus in this embodiment of this application may be an apparatus with an operating system. The operating system may be an Android operating system, may be an iOS operating system, or may be another possible operating system. This is not specifically limited in this embodiment of this application.

The white balance compensation apparatus provided in this embodiment of this application is capable of implementing various processes that are implemented in the method embodiments of FIG. 1 to FIG. 3. To avoid repetition, details are not described herein again.

Figure 5:
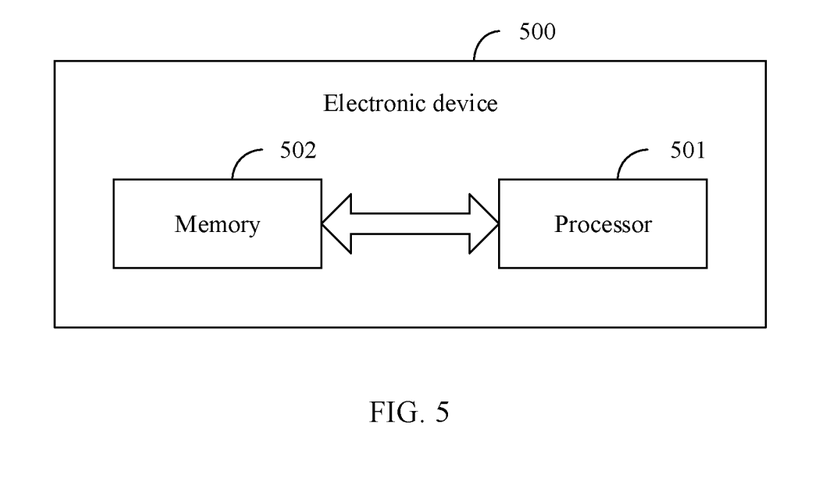
FIG. 5 is a first schematic diagram of hardware of an electronic device according to an embodiment of this application.

Optionally, as shown in FIG. 5, an embodiment of this application further provides an electronic device 500, including a processor 501, a memory 502, and a program or instructions stored in the memory 502 and capable of running on the processor 501. When the program or instructions are executed by the processor 501, the processes of the foregoing embodiments of the white balance compensation method are implemented, with the same technical effects achieved. To avoid repetition, details are not described herein again.

It should be noted that the electronic device in this embodiment of this application includes the foregoing mobile electronic device and non-mobile electronic device.

Figure 6:
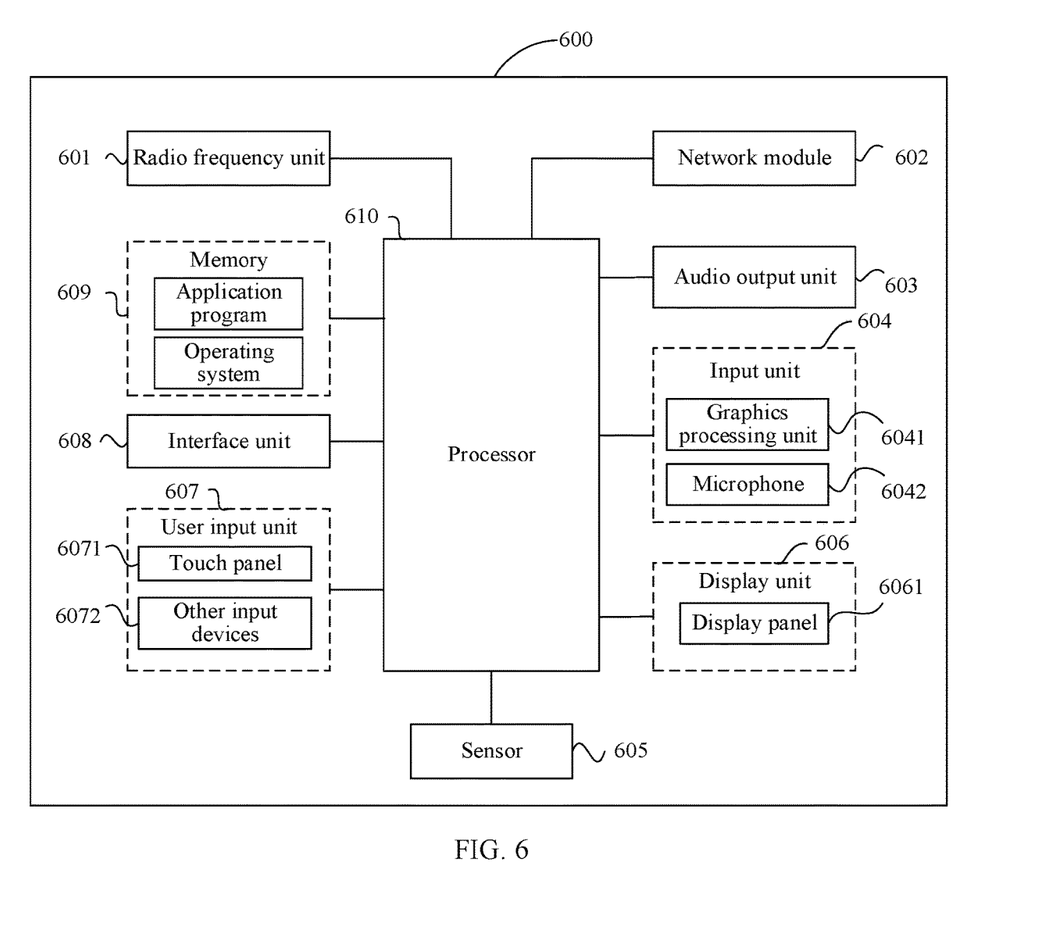
FIG. 6 is a second schematic diagram of hardware of an electronic device according to an embodiment of this application.

FIG. 6 is a schematic diagram of a hardware structure of an electronic device according to an embodiment of this application.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Those skilled in the art can understand that the electronic device 600 may further include a power supply (for example, a battery) that supplies power to various components. The power supply may be logically connected to the processor 610 through a power management system, so that functions such as charge and discharge management and power consumption management are implemented by using the power management system. The structure of the electronic device shown in FIG. 6 does not constitute a limitation on the electronic device. The electronic device may include more or fewer components than those shown in the figure, or combine some of the components, or arrange the components differently. Details are not described herein.

The processor 610 is configured to obtain color information of each of M first regions included in a first image, the first image being an image acquired by a spectral sensor. The processor 610 is further configured to perform white balance compensation using a target numerical value for a second image acquired by a color sensor, and obtain color information of each of M second regions included in the white-balance compensated second image, one second region corresponding to one first region. The processing module 610 is further configured to: for an i-th second region, in a case that first color information and second color information meet a preset condition, perform white balance compensation for the i-th second region according to the first color information and the second color information, where the first color information is color information of the i-th second region, and the second color information is color information of a first region corresponding to the i-th second region. M is an integer greater than 1, and i is a positive integer less than or equal to M.

Optionally, the processing module 610 is specifically configured to: use a product of the first color value and a first preset ratio as a first compensation value; use a product of the second color value and a second preset ratio as a second compensation value; use a sum of the first compensation value and the second compensation value as a target compensation value; and perform white balance compensation for the i-th second region according to the target compensation value.

Optionally, the processing module 610 is specifically configured to obtain color information of each first region according to a spectral curve of each first region.

Optionally, the color information of each first region includes at least a color temperature value of each first region. The processor 610 may be specifically configured to:

integrate the spectral curve of each first region with a first preset equation, a second preset equation, and a third preset equation to obtain an intensity value of the R color channel of each first region, an intensity value of the G color channel of each first region, and an intensity value of the B color channel of each first region, respectively;

convert the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and obtain a color temperature value of each first region based on the intensity value of the X color space, the intensity value of the Y color space, and the intensity value of the Z color space.

Optionally, each first region includes N pixels, N being an integer greater than 1. The processing module 610 is further configured to divide the visible light wavelength range into N band ranges before color information of each first region is obtained according to a spectral curve of each first region, one of the N pixels corresponding to one of the N band ranges. The processing module 610 may be further configured to obtain a photosensitive value of each pixel in a band range corresponding to each pixel and obtain a spectral curve of each first region according to the photosensitive values of the N pixels.

This application provides an electronic device. Because characteristics of the spectral sensor and the color sensor in the electronic device are different and all first regions of the first image acquired by a spectral sensor are in one-to-one correspondence with all second regions of a white-balance compensated second image acquired by a color sensor, when the color information of a first region and the color information of a second region meet the preset condition, the electronic device can perform AWB compensation for the color information of the second region by using the color information of the first region, thereby improving the color reduction effect of the shot picture.

It should be understood that in this embodiment of this application, the input unit 604 may include a graphics processing unit (GPU) 6041 and a microphone 6042. The graphics processing unit 6041 processes image data of a static picture or a video that is obtained by an image capture apparatus (for example, a camera) in a video capture mode or an image capture mode. The display unit 606 may include the display panel 6061. The display panel 6061 may be configured in a form of a liquid crystal display, an organic light-emitting diode, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function button (for example, a volume control button or a power button), a trackball, a mouse, and a joystick. Details are not described herein. The memory 609 may be configured to store a software program and various data, including but not limited to an application program and an operating system. The processor 610 may integrate an application processor and a modem processor. The application processor mainly processes an operating system, a user interface, an application program, and the like. The modem processor mainly processes wireless communication. It can be understood that the modem processor may alternatively be not integrated into the processor 610.

An embodiment of this application further provides a readable storage medium, where the readable storage medium stores a program or instructions, and when the program or instructions are executed by a processor, the processes of the foregoing embodiments of the white balance compensation method are implemented, with the same technical effects achieved. To avoid repetition, details are not described herein again.

The processor is the processor of the electronic device in the foregoing embodiment. The readable storage medium includes a computer-readable storage medium such as a read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement the processes of the foregoing embodiments of the white balance compensation method, with the same technical effects achieved. To avoid repetition, details are not described herein again.

It should be understood that the chip mentioned in this embodiment of this application may also be referred to as a system-on-chip, a system chip, a chip system, or the like.

It should be noted that the terms "comprise", "include", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A white balance compensation method, wherein the method comprises:
   obtaining color information of each of M first regions comprised in a first image, the first image being an image acquired by a spectral sensor;
   performing white balance compensation using a target numerical value for a second image acquired by a color sensor, and obtaining color information of each of M second regions comprised in the white-balance compensated second image, one second region corresponding to one first region; and
   for an i-th second region, in a case that first color information and second color information meet a preset condition, performing white balance compensation for the i-th second region according to the first color information and the second color information, wherein the first color information is color information of the i-th second region, and the second color information is color information of a first region corresponding to the i-th second region; wherein
   M is an integer greater than 1, and i is a positive integer less than or equal to M;
   wherein the obtaining color information of each of M first regions comprised in a first image comprises:
   obtaining color information of each first region according to a spectral curve of each first region.

2. The method according to claim 1, wherein the first color information is a first color value, the second color information is a second color value, and the preset condition is that an absolute value of a difference between the first color value and the second value is greater than or equal to a preset color value; wherein
   the first color value and the second value meet at least one of the following:
   the first color value comprises an intensity value of an R color channel of the i-th second region, and the second color value comprises an intensity value of an R color channel of a first region corresponding to the i-th second region;
   the first color value comprises an intensity value of a G color channel of the i-th second region, and the second color value comprises an intensity value of a G color channel of a first region corresponding to the i-th second region;
   the first color value comprises an intensity value of a B color channel of the i-th second region, and the second color value comprises an intensity value of a B color channel of a first region corresponding to the i-th second region; or
   the first color value comprises a color temperature value of the i-th second region, and the second color value comprises a color temperature value of a first region corresponding to the i-th second region.

3. The method according to claim 2, wherein the performing white balance compensation for the i-th second region according to the first color information and the second color information comprises:
   using a product of the first color value and a first preset ratio as a first compensation value;
   using a product of the second color value and a second preset ratio as a second compensation value;
   using a sum of the first compensation value and the second compensation value as a target compensation value; and
   performing white balance compensation for the i-th second region according to the target compensation value.

4. The method according to claim 1, wherein the color information of each first region comprises at least a color temperature value of each first region; and the obtaining color information of each first region according to a spectral curve of each first region comprises:
   integrating the spectral curve of each first region with a first preset equation, a second preset equation, and a third preset equation to obtain an intensity value of an R color channel of each first region, an intensity value of a G color channel of each first region, and an intensity value of a B color channel of each first region, respectively;
   converting the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and obtaining a color temperature value of each first region based on the intensity value of the X color space, the intensity value of the Y color space, and the intensity value of the Z color space.

5. The method according to claim 1, wherein each first region comprises N pixels, N being an integer greater than 1; and before the obtaining color information of each first region according to a spectral curve of each first region, the method further comprises:

dividing the visible light wavelength range into N band ranges, one of the N pixels corresponding to one of the N band ranges;

obtaining a photosensitive value of each pixel in a band range corresponding to each pixel; and obtaining a spectral curve of each first region according to the photosensitive values of the N pixels.

6. An electronic device, comprising a processor, a memory, and instructions stored in the memory and capable of running on the processor, wherein when the instructions are executed by the processor, steps of a white balance compensation method are implemented, the steps comprise:

obtaining color information of each of M first regions comprised in a first image, the first image being an image acquired by a spectral sensor;

performing white balance compensation using a target numerical value for a second image acquired by a color sensor, and obtaining color information of each of M second regions comprised in the white-balance compensated second image, one second region corresponding to one first region; and for an i-th second region, in a case that first color information and second color information meet a preset condition, performing white balance compensation for the i-th second region according to the first color information and the second color information, wherein the first color information is color information of the i-th second region, and the second color information is color information of a first region corresponding to the i-th second region; wherein M is an integer greater than 1, and i is a positive integer less than or equal to M;

wherein the step of obtaining color information of each of M first regions comprised in a first image comprises:

obtaining color information of each first region according to a spectral curve of each first region.

7. The electronic device according to claim 6, wherein the first color information is a first color value, the second color information is a second color value, and the preset condition is that an absolute value of a difference between the first color value and the second value is greater than or equal to a preset color value; wherein the first color value and the second value meet at least one of the following:

the first color value comprises an intensity value of an R color channel of the i-th second region, and the second color value comprises an intensity value of an R color channel of a first region corresponding to the i-th second region;

the first color value comprises an intensity value of a G color channel of the i-th second region, and the second color value comprises an intensity value of a G color channel of a first region corresponding to the i-th second region;

the first color value comprises an intensity value of a B color channel of the i-th second region, and the second color value comprises an intensity value of a B color channel of a first region corresponding to the i-th second region; or the first color value comprises a color temperature value of the i-th second region, and the second color value comprises a color temperature value of a first region corresponding to the i-th second region.

8. The electronic device according to claim 7, wherein the step of performing white balance compensation for the i-th second region according to the first color information and the second color information comprises:

using a product of the first color value and a first preset ratio as a first compensation value;

using a product of the second color value and a second preset ratio as a second compensation value;

using a sum of the first compensation value and the second compensation value as a target compensation value; and performing white balance compensation for the i-th second region according to the target compensation value.

9. The electronic device according to claim 6, wherein the color information of each first region comprises at least a color temperature value of each first region; and the step of obtaining color information of each first region according to a spectral curve of each first region comprises:

integrating the spectral curve of each first region with a first preset equation, a second preset equation, and a third preset equation to obtain an intensity value of an R color channel of each first region, an intensity value of a G color channel of each first region, and an intensity value of a B color channel of each first region, respectively;

converting the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and obtaining a color temperature value of each first region based on the intensity value of the X color space, the intensity value of the Y color space, and the intensity value of the Z color space.

10. The electronic device according to claim 6, wherein each first region comprises N pixels, N being an integer greater than 1; and before the step of obtaining color information of each first region according to a spectral curve of each first region, the method further comprises steps of:

dividing the visible light wavelength range into N band ranges, one of the N pixels corresponding to one of the N band ranges;

obtaining a photosensitive value of each pixel in a band range corresponding to each pixel; and obtaining a spectral curve of each first region according to the photosensitive values of the N pixels.

11. A non-transitory readable storage medium, wherein the readable storage medium stores instructions, and when the instructions are executed by a processor, steps of a white balance compensation method are implemented, the steps comprise:

obtaining color information of each of M first regions comprised in a first image, the first image being an image acquired by a spectral sensor;

performing white balance compensation using a target numerical value for a second image acquired by a color sensor, and obtaining color information of each of M second regions comprised in the white-balance compensated second image, one second region corresponding to one first region; and for an i-th second region, in a case that first color information and second color information meet a preset condition, performing white balance compensation for the i-th second region according to the first color information and the second color information, wherein the first color information is color information of the i-th second region, and the second color information is color information of a first region corresponding to the i-th second region; wherein M is an integer greater than 1, and i is a positive integer less than or equal to M;

wherein the step of obtaining color information of each of M first regions comprised in a first image comprises:

obtaining color information of each first region according to a spectral curve of each first region.

12. The storage medium according to claim 11, wherein the first color information is a first color value, the second color information is a second color value, and the preset condition is that an absolute value of a difference between the first color value and the second value is greater than or equal to a preset color value; wherein the first color value and the second value meet at least one of the following:

the first color value comprises an intensity value of an R color channel of the i-th second region, and the second color value comprises an intensity value of an R color channel of a first region corresponding to the i-th second region;

the first color value comprises an intensity value of a G color channel of the i-th second region, and the second color value comprises an intensity value of a G color channel of a first region corresponding to the i-th second region;

the first color value comprises an intensity value of a B color channel of the i-th second region, and the second color value comprises an intensity value of a B color channel of a first region corresponding to the i-th second region; or the first color value comprises a color temperature value of the i-th second region, and the second color value comprises a color temperature value of a first region corresponding to the i-th second region.

13. The storage medium according to claim 12, wherein the step of performing white balance compensation for the i-th second region according to the first color information and the second color information comprises:

using a product of the first color value and a first preset ratio as a first compensation value;

using a product of the second color value and a second preset ratio as a second compensation value;

using a sum of the first compensation value and the second compensation value as a target compensation value; and performing white balance compensation for the i-th second region according to the target compensation value.

14. The storage medium according to claim 11, wherein the color information of each first region comprises at least a color temperature value of each first region; and the step of obtaining color information of each first region according to a spectral curve of each first region comprises:

integrating the spectral curve of each first region with a first preset equation, a second preset equation, and a third preset equation to obtain an intensity value of an R color channel of each first region, an intensity value of a G color channel of each first region, and an intensity value of a B color channel of each first region, respectively;

converting the intensity value of the R color channel of each first region, the intensity value of the G color channel of each first region, and the intensity value of the B color channel of each first region into an intensity value of an X color space, an intensity value of a Y color space, and an intensity value of a Z color space, respectively; and obtaining a color temperature value of each first region based on the intensity value of the X color space, the intensity value of the Y color space, and the intensity value of the Z color space.

15. The storage medium according to claim 11, wherein each first region comprises N pixels, N being an integer greater than 1; and before the step of obtaining color information of each first region according to a spectral curve of each first region, the method further comprises steps of:

dividing the visible light wavelength range into N band ranges, one of the N pixels corresponding to one of the N band ranges;

obtaining a photosensitive value of each pixel in a band range corresponding to each pixel; and obtaining a spectral curve of each first region according to the photosensitive values of the N pixels.

* * * * *